(12) United States Patent
Yamada et al.

(10) Patent No.: US 12,059,871 B2
(45) Date of Patent: Aug. 13, 2024

(54) MULTILAYER FILMS FOR AIRBAG APPLICATIONS AND RELATED METHODS

(71) Applicant: ZF Automotive Germany GmbH, Alfdorf (DE)

(72) Inventors: Yosuke Yamada, Osaka (JP); Toru Tagami, Osaka (JP); Michael Ludwig, Raubling (DE)

(73) Assignee: ZF Automotive Germany GmbH, Alfdorf (DE)

( * ) Notice: Subject to any disclaimer, the term of this patent is extended or adjusted under 35 U.S.C. 154(b) by 0 days.

(21) Appl. No.: 17/600,398

(22) PCT Filed: Apr. 3, 2020

(86) PCT No.: PCT/EP2020/059559
§ 371 (c)(1),
(2) Date: Sep. 30, 2021

(87) PCT Pub. No.: WO2020/207918
PCT Pub. Date: Oct. 15, 2020

(65) Prior Publication Data
US 2022/0219434 A1    Jul. 14, 2022

(30) Foreign Application Priority Data
Apr. 12, 2019   (EP) .................................. 19168887

(51) Int. Cl.
*B32B 27/08*   (2006.01)
*B32B 1/00*    (2024.01)
(Continued)

(52) U.S. Cl.
CPC ................ *B32B 27/08* (2013.01); *B32B 1/00* (2013.01); *B32B 5/024* (2013.01); *B32B 5/026* (2013.01);
(Continued)

(58) Field of Classification Search
CPC ........... B32B 27/08; B32B 1/00; B32B 5/024; B32B 5/026; B32B 7/12; B32B 27/12;
(Continued)

(56) References Cited

U.S. PATENT DOCUMENTS

2007/0065614 A1    3/2007   Schulthess

FOREIGN PATENT DOCUMENTS

| CA | 3067204 | * 12/2018 | ............. B32B 37/04 |
| EP | 0990515 A1 | 4/2000 | |

(Continued)

OTHER PUBLICATIONS

English translation for WO201903955. (Year: 2019).*
(Continued)

*Primary Examiner* — Michael C Miggins
(74) *Attorney, Agent, or Firm* — Edwards Neils LLC; Jean C. Edwards, Esq.

(57) ABSTRACT

A multilayer film is provided that includes a) a barrier layer including a thermoplastic polyester elastomer or a polyamide copolymer; b) an intermediate layer provided on the barrier layer and including a maleic anhydride (MAH)-grafted polyolefin and an α-olefin copolymer; and c) an adhesive layer provided on the intermediate layer and including a thermoplastic polyester elastomer or a polyamide copolymer. The multilayer film enables production of gas-tight multilayer laminates which exhibit an excellent peel resistance combined with a low weight and/or thickness. Further, a multilayer laminate and an inflatable airbag that include a fabric layer adhered to the multilayer film, as well as methods of manufacturing are described.

20 Claims, 1 Drawing Sheet

(51) Int. Cl.
| | |
|---|---|
| *B32B 5/02* | (2006.01) |
| *B32B 7/12* | (2006.01) |
| *B32B 27/12* | (2006.01) |
| *B32B 27/18* | (2006.01) |
| *B32B 27/32* | (2006.01) |
| *B32B 27/34* | (2006.01) |
| *B32B 27/36* | (2006.01) |
| *B32B 37/12* | (2006.01) |
| *B60R 21/235* | (2006.01) |

(52) U.S. Cl.
CPC ............. *B32B 7/12* (2013.01); *B32B 27/12* (2013.01); *B32B 27/18* (2013.01); *B32B 27/32* (2013.01); *B32B 27/34* (2013.01); *B32B 27/36* (2013.01); *B32B 37/12* (2013.01); *B60R 21/235* (2013.01); *B32B 2250/24* (2013.01); *B32B 2262/0261* (2013.01); *B32B 2262/0276* (2013.01); *B32B 2270/00* (2013.01); *B32B 2274/00* (2013.01); *B32B 2307/536* (2013.01); *B32B 2307/72* (2013.01); *B32B 2307/7242* (2013.01); *B32B 2307/732* (2013.01); *B32B 2571/00* (2013.01); *B32B 2605/08* (2013.01); *B60R 2021/23542* (2013.01); *B60R 2021/23552* (2013.01)

(58) Field of Classification Search
CPC ......... B32B 27/18; B32B 27/32; B32B 27/34; B32B 27/36; B32B 37/12; B32B 2250/24; B32B 2262/0261; B32B 2262/0276
See application file for complete search history.

(56) References Cited

FOREIGN PATENT DOCUMENTS

| | | | |
|---|---|---|---|
| WO | 2016/069335 A1 | 5/2016 | |
| WO | WO2019039555 | * 2/2019 | ............ B32B 27/12 |

OTHER PUBLICATIONS

International Search Report Issued in PCT/EP2020/059559 on May 27, 2020.
Written Opinion Issued in PCT/EP2020/059559 on May 27, 2020.

* cited by examiner

MULTILAYER FILMS FOR AIRBAG APPLICATIONS AND RELATED METHODS

CROSS-REFERENCE TO RELATED APPLICATIONS

The present application is a 35 U.S.C. 371 National Stage Entry of: PCT/EP2020/059559, filed on Apr. 3, 2020, which claims priority from European Patent Application No. 19168887.8, filed on Apr. 12, 2019, the contents of all of which are herein incorporated by reference in their entirety.

FIELD OF INVENTION

The invention relates to multilayer films for airtight coatings of fabrics and to multilayer laminates comprising said multilayer films. In addition, the present invention relates to methods of manufacturing said multilayer films, and an inflatable airbag comprising said multilayer laminates.

BACKGROUND OF THE INVENTION

Incorporating airbags into vehicles in order to provide the occupants with a soft cushioning and restraint during a crash event is known practice.

The most widely used variant, namely the frontal airbag, is designed to inflate extremely rapidly then quickly deflate during a collision.

However, in the recent decades, several types of airbags have been developed which require to maintain the inflated state for prolonged periods of time. For example, curtain airbags which are disposed above doors and inflate and deploy along vehicle side windows desirably remain expanded until and during a rollover, to thereby restrain the occupant, and prevent the occupant from injuries until the crash event is concluded. It is also known to integrate airbags into a backpack to produce so-called avalanche airbags, which are intended to maintain the inflated state in order to prevent an avalanche victim from sinking below the snow cover.

In order to meet these requirements, the airbag material should exhibit high strength and suitable gas-tight properties both on the main airbag surface and at the seams formed by sewing together or adhering multiple sections of the airbag.

Simultaneously, in order to exhibit a low volume in the deflated state and to avoid unnecessary weight contribution to the vehicle, backpack or other airbag-containing article, said material is desirably lightweight and thin.

Typically, airbags exhibit a multilayer structure comprising a substrate layer which provides for the strength, such as a knitted or woven fabric, for example, onto which one or more polymer-based layers enabling the gas tightness are coated. Exemplary multilayer materials are disclosed in EP 1 518 761 A1 and US 2007/0065614 A1, for example. A simple approach to reduce both thickness and weight of the coated fabric is to decrease the amount of coating material on the fabric. In practice, however, the reduction of coating weight is highly limited due to formation of local pinholes (i.e. small uncoated areas) during or after the coating process which are detrimental to the gas tightness of the multilayer structure. In addition or alternatively, the peel strength between the coating material and the fabric tends to be lowered upon decreasing the coating weight. In addition, in cases where the surface or geometry of the airbag (particularly in the inflated state) is irregular or complex, delamination between the constituting layers of the airbag material is often observed. In WO 2016/069335 A1, multilayer film structures for barriers in microfluidic delivery systems are disclosed, which comprise a tie layer including a thermoplastic elastomer and a functionalized olefin-based polymer. However, a specific multilayer film suitable for airbag applications is not disclosed therein. EP 0 990 515 A1 discloses a three-layer structure with an intermediate layer comprising a maleic anhydride (MAH)-grafted ethylene copolymer in combination with polyethylene. However, the resulting multilayer laminates tend to be prone to delamination.

It is therefore the object of the invention to provide multilayer films and laminates which overcome the above-mentioned problems and enable the provision of thin and light-weight airbags that are not prone to disintegration and exhibit sufficient strength and gas impermeability to be effectively used for applications which necessitate full deployment of the airbag for prolonged periods of time (e.g. curtain airbags and comparable applications).

In addition, it is an object of the present invention to provide multilayer films and laminates which may be produced inexpensively and allow for a wide range of processing conditions (e.g. temperature and/or pressure during lamination).

SUMMARY OF THE INVENTION

The present invention solves these objects with the subject matter of the claims as defined herein. Further advantages of the present invention will be further explained in detail in the section below.

In general, the present invention relates to a multilayer film comprising: a) a barrier layer comprising a thermoplastic polyester elastomer or a polyamide copolymer; b) an intermediate layer provided on the barrier layer and comprising a maleic anhydride (MAH)-grafted polyolefin and an α-olefin copolymer; and c) an adhesive layer provided on the intermediate layer and comprising a thermoplastic polyester elastomer or a polyamide copolymer.

The multilayer film may be used as a coating layer for synthetic fabrics with excellent peeling resistance and may be coated with a low thickness and/or coating weight without being prone to pinhole formation.

In other aspect, the present invention provides a multilayer laminate comprising a fabric layer adhered to the aforementioned multilayer film via the adhesive layer as well as a method for its manufacture.

Other aspects of the present invention relate to an inflatable airbag comprising the aforementioned multilayer laminate and to the use of the aforementioned multilayer film for the gas-tight coating of a woven or knitted fabric.

Preferred embodiments of, as well as other aspects of the present invention are described in the following description and the claims.

DETAILED DESCRIPTION OF THE INVENTION

For a more complete understanding of the present invention, reference is now made to the following description of the illustrative embodiments thereof:

Multilayer Film

In a first embodiment, the present invention generally relates to a multilayer film comprising: a) a barrier layer comprising a thermoplastic polyester elastomer or a polyamide copolymer; b) an intermediate layer provided on the barrier layer and comprising a maleic anhydride (MAH)-grafted polyolefin and an α-olefin copolymer, and c) an adhesive layer provided on the intermediate layer and comprising a thermoplastic polyester elastomer or a polyamide copolymer.

Figure 1A:
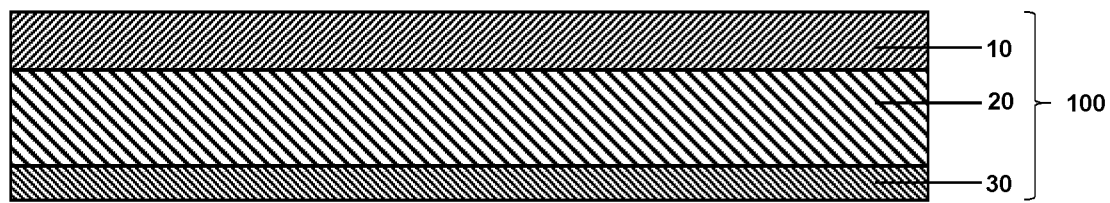
FIG. 1A illustrates a triple layer-film in accordance to an exemplary embodiment of the present invention.

As illustrated in FIG. 1, the multilayer film (100) according to the present embodiment has at least a three-layer structure comprising a barrier layer (10), and intermediate layer (20) and an adhesive layer (30). By using the multilayer film as a coating for fabric or net substrates, adhesion to the substrate and gas tightness may be improved compared to single-layer coatings since there is no need to balance gas barrier and adhesion properties. The barrier layer (10) is generally characterized in that it prevents gas from flowing in and out of the layer. The adhesive layer (30) is a layer which shows adhesiveness to a fabric or net-type substrate. Typically, this adhesiveness is exhibited by softening or melting under predetermined conditions, for example, under conditions of increased temperature and/or pressure.

In the present invention, the barrier layer comprises at least one of a thermoplastic polyester elastomer or a polyamide copolymer, which enables favourable low-temperature impact strength, scrub resistance, enhanced flexibility and softness.

Commercially available examples of copolyesters include thermoplastic polyester elastomers from the HYTREL™ series, available from DowDuPont, Inc., from the MODIC™ series, available from Mitsubishi Chemical Co. and from the ARNITEL® series, available from DSM Engineering Plastics B.V. Commercially available examples of polyamides and copolyamides include the UBE Nylon series, available from Ube Industries, Ltd., the VESTAMID® series, available from Evonik AG, and the PEBAX® series from Arkema, S.A.

In preferred embodiments, the melting point of the barrier layer is higher than that of the intermediate layer. Therefore, when the multilayer film is laminated by being subjected to heating at a temperature lower than the melting point of the barrier layer, softening of the material constituting the barrier layer is avoided.

The melting point of the barrier layer is preferably at least 170° C. In a further preferred embodiment, the melting point of the barrier layer is 180° C. or more, more preferably 185° C. or more, especially preferably between 190° C. and 300° C., such as from 195° C. to 270° C. In general, the melting point or temperature may be determined by methods known in the art, such as according to ISO 11357-1/-3.

In preferred embodiments, the thickness of the barrier layer is in the range of 2 to 30 μm, further preferably in the range of 2 to 20 μm, and especially preferably in the range of 2 to 15 μm.

The surface density of the barrier layer is preferably in the range of from 2 to 35 g/m$^2$, more preferably from 5 to 30 g/m$^2$, and further preferably from 7 to 20 g/m$^2$.

The intermediate layer used in the present invention essentially comprises an α-olefin copolymer and at least one maleic anhydride (MAH)-grafted polyolefin. The terms "maleic anhydride (MAH)-grafted polyolefin" and "MAH-grafted polyolefin", as used herein, denote olefin-based homo- or co-polymers grafted with maleic anhydride. MAH-grafted polyolefins may be synthesized by methods known by the skilled artisan, including radical polymerization, for example. Due to formation of strong polar bonds to the polymers comprising heteroatomic groups in the barrier layer and adhesive layer (i.e. the thermoplastic polyester elastomers or polyamide copolymers), the maleic anhydride groups present in the MAH-grafted polyolefin ensure particularly high peeling strength and delamination resistance within the multilayer film.

While not being limited thereto, the MAH-grafted polyolefin is preferably based on a polymer or co-polymer of $C_2$-$C_{20}$ olefins. In further preferred embodiments, the MAH-grafted polyolefin is selected from MAH-grafted polyethylene, MAH-grafted polypropylene, or copolymers thereof.

While not being limited thereto, suitable base polymers for MAH-grafted polyethylene and its copolymers include high density polyethylene (HDPE), low density polyethylene (LDPE), linear low density polyethylene (LLDPE), very low density polyethylene (VDLPE), ultra low density polyethylene (ULDPE), linear ethylene/α-olefin interpolymers, substantially linear ethylene/α-olefin interpolymers, or olefin multi-block interpolymers. Especially preferred base polymers include LDPE, LLDPE, VDLPE (having a density of between 0.89 to 0.914 g/cm$^3$) and ULDPE (having a density of less than 0.89 g/cm$^3$). The term "interpolymer", as used herein, comprises any polymer having more than one polymerized monomer, including copolymers and terpolymers, tetrapolymers and so on. While not being limited thereto, preferred co-monomers to be polymerized with ethylene include $C_3$-$C_{20}$ α-olefins, more preferably $C_3$-$C_{10}$ α-olefins, and especially preferably propylene, 1-butene, 1-pentene, 1-hexene, 4-methyl-1-pentene, 1-heptene and 1-octene. Further preferred co-monomers include propylene, 1-butene, 1-hexene and 1-octene. Commercially available examples of suitable ethylene-based interpolymers include ENGAGE™, ATTANE™, AFFINITY™, DOWLEX™, ELITE™, all available from The Dow Chemical Company; EXCEED™ and EXACT™ available from Exxon Chemical Company; and MAH-grafted PE from the OREVACT™ series, available from Arkema, S.A. ADMER™ polymers available from the Mitsui Chemical Company.

Suitable base polymers for maleic anhydride (MAH)-grafted polyolefins also include polypropylene homopolymers and propylene copolymers, and other olefin-based polymers, such as those formed from one or more $C_4$-$C_{20}$ alpha-olefins. Commercially available examples of MAH-grafted polypropylene include MAH-grafted PP from the OREVAC™ series, available from Arkema, S.A. The olefin-based polymers may optionally contain copolymerizable conjugated dienes, non-conjugated dienes and/or vinyl monomers. In a preferred embodiment of the invention, a propylene-based interpolymer is used as the base polymer in the grafting reaction. Preferred comonomers include, but are not limited to, ethylene, isobutylene, 1-butene, 1-pentene, 1-hexene, 3-methyl-1-pentene, 4-methyl-1-pentene, 1-octene, non-conjugated dienes, polyenes, butadienes, isoprenes, pentadienes, hexadienes (for example, 1,4-hexadiene), octadienes, styrene, halo-substituted styrene, alkyl-substituted styrene, tetrafluoroethylenes, vinylbenzocyclobutene, naphthenics, cycloalkenes (for example, cyclopentene, cyclohexene, cyclooctene), and mixtures thereof. Preferably, the comonomer is an ethylene or a $C_4$-$C_{20}$ α-olefin. Further preferred comonomers include ethylene, 1-butene, 1-pentene, 1-hexene, 1-heptene and 1-octene, and more preferably include ethylene, 1-butene, 1-hexene and 1-octene.

In further preferred embodiments, the intermediate layer used in the present invention comprises a blend of MAH-grafted polyolefin and a non-MAH-modified polyolefin. In this case, the MAH-grafted polyolefin is preferably selected from MAH-grafted polyethylene, MAH-grafted polypropylene, or copolymers thereof; and the non-MAH-modified polyolefin is preferably selected from polyethylene or polypropylene. While not being limited thereto, suitable polyolefins include high density polyethylene (HDPE), low density polyethylene (LDPE), linear low density polyethylene (LLDPE), very low density polyethylene (VDLPE), ultra low density polyethylene (ULDPE), linear ethylene/α-olefin interpolymers, substantially linear ethylene/α-olefin interpolymers, or olefin multi-block interpolymers. Especially preferred base polymers include LDPE, LLDPE, VDLPE (having a density of between 0.89 to 0.914 g/cm$^3$) and ULDPE (having a density of less than 0.89 g/cm$^3$). Commercially available examples of corresponding PE-blends include PLEXAR™ PX3227, available from LyondellBasell, Inc., and MAH-modified polyolefins from the AMPLIFY™ series, available from The Dow Chemical Company.

While not being limited thereto, the maleic anhydride (MAH)-grafted polyolefin preferably comprises 0.1 to 2.0 wt.-% MAH, further preferably between 0.25 to 1.5 wt.-% MAH, each based on the total weight of the maleic anhydride (MAH)-grafted polyolefin.

In the multilayer film of the present invention, the content of the maleic anhydride (MAH)-grafted polyolefin (or the total content of MAH-grafted polyolefin and non-MAH-modified polyolefin, if the latter is present) in the intermediate layer preferably ranges from 10 to 100 wt.-% based on the total weight of the intermediate layer.

According to the present invention, the intermediate layer comprises—in addition to the MAH-grafted polyolefin—an α-olefin copolymer, preferably an elastomeric α-olefin copolymer comprising a $C_3$-$C_{12}$ alkene, which remarkably increases the peel strength of the intermediate layer towards the adjacent layers and thus significantly reduces delamination effects. While not being limited thereto, said α-olefin copolymer is preferably not grafted with MAH. The presence of branched polymer chains established by α-olefin copolymers promotes entanglement between side chains and van der Waals interaction with the polymers comprised in the adjacent layers, and thus increases the peel strength and provides the multilayer film with softness and rubber-like properties. Preferred examples of α-olefin copolymers include, but are not limited to copolymers of ethylene and linear or branched $C_3$-$C_{12}$ α-olefins, such as propene, 1-butene, isobutylene, 1-pentene, and 1-octene, for example.

In presence of an α-olefin copolymer, the content of the maleic anhydride (MAH)-grafted polyolefin (or the total content of MAH-grafted polyolefin and non-MAH-modified polyolefin, if the latter is present) in the intermediate layer preferably ranges from 10 to 95 wt.-%, further preferably from 25 to 90 wt.-%, such as from 35 to 90 wt.-%, and the content of the α-olefin copolymer preferably ranges from 5 to 90 wt.-%, more preferably from 7 to 80 wt.-%, further preferably from 10 to 65 wt.-%, based on the total weight of the intermediate layer, in order to provide for excellent flexibility and elasticity while retaining sufficient mechanical strength. The peel strength may be further enhanced by setting the content of the maleic anhydride (MAH)-grafted polyolefin (or the total content of MAH-grafted polyolefin and non-MAH-modified polyolefin, if the latter is present) in the intermediate layer to 30 to 90 wt.-%, and the content of the α-olefin copolymer to 10 to 65 wt.-%.

In a preferred embodiment, the intermediate layer further comprises a polymer having a Shore D hardness according to ISO 868 of less than 80, such as from 30 to 80, or from 35 to 75. While not being limited thereto, such polymers may be selected from polyolefins or thermoplastic elastomers, for example. Examples of suitable polyolefins include, but are not limited to polyethylene and polypropylene. Suitable thermoplastic elastomers (TPEs) include, but are not limited to, olefin-based TPEs (e.g. PP/EPDM), thermoplastic polyester elastomers (TPEEs), styrene block copolymers (including, but not limited to styrene-butadiene-styrene (SBS), styrene-isoprene-styrene (SIS), styrene-isoprene/butadiene-styrene (SIBS), styrene-ethylene/butylene-styrene (SEBS), styrene-ethylene/propylene (SEP), and styrene-ethylene/propylene-styrene (SEPS)), co-polyester-based thermoplastic elastomers (TPC), urethane-based thermoplastic elastomers (TPU), or polyamide-based thermoplastic elastomers (TPA), for example. In preferred embodiments, the polymer having a Shore D hardness in the above-identified range is comprised at a content of from 0.5 to 65 wt.-%, more preferably a content of from 0.5 to 40 wt.-%, further preferably at a content of from 1 to 30 wt.-%, based on the total weight of the intermediate layer.

In preferred embodiments, the thickness of the intermediate layer is in the range of 1 to 50 μm, further preferably in the range of 2 to 30 μm, and especially preferably in the range of 2 to 15 μm.

The surface density of the intermediate layer is preferably in the range of from 5 to 50 g/m$^2$, more preferably from 8 to 45 g/m$^2$, especially preferably from 10 to 40 g/m$^2$.

According to the present invention, the adhesive layer provided on the intermediate layer comprises at least one thermoplastic polyester elastomer and/or at least one polyamide copolymer.

Herein, the thermoplastic polyester elastomers and polyamide copolymers are preferably selected from those mentioned above as constituents of the barrier layer, and may be different or identical. Preferably, the thermoplastic polyester elastomers and polyamide copolymers in the adhesive layer exhibit a lower melt temperature than the thermoplastic polyester elastomers and polyamide copolymers in the barrier layer. In especially preferred embodiments, the melt temperature difference between the melt temperatures of thermoplastic polyester elastomers and polyamide copolymers in the adhesive layer and those of the barrier layer is at least 20° C., such as at least 30° C. or at least 40° C. It may also be preferred that the glass transition temperature of thermoplastic polyester elastomers and polyamide copolymers in the adhesive layer is lower than of those in the barrier layer, further preferably −10° C. or lower, especially preferably −20° C. or lower (which may be determined according to ISO 11357-1/-2, for example).

In preferred embodiments, the content of thermoplastic polyester elastomers or polyamide copolymers (or the total content thereof, if both are present) is at least 50 wt-%, more preferably at least 60 wt.-%, especially preferably at least 70 wt.-%, based on the total weight of the adhesive layer.

The adhesive layer may further comprise a polyolefin, which is preferably selected from polyethylene or polypropylene. Suitable polyethylene types include high density polyethylene (HDPE), low density polyethylene (LDPE), linear low density polyethylene (LLDPE), very low density polyethylene (VDLPE) and ultra low density polyethylene (ULDPE), of which LDPE is particularly preferred. If present, the content of the polyolefin preferably ranges from 0.5 wt.-% to 30 wt.-%, further preferably from 1 to 20 wt.-%, based on the total weight of the adhesive layer. In a preferred embodiment, the intermediate layer further comprises a polymer having a Shore D hardness according to ISO 868 of less than 80, such as from 30 to 80, or from 35 to 75. While not being limited thereto, such polymers may be selected from polyolefins or thermoplastic elastomers, for example. Examples of suitable polyolefins include, but are not limited to polyethylene and polypropylene. Suitable thermoplastic elastomers (TPEs) include, but are not limited to, olefin-based TPEs (e.g. PP/EPDM), styrene block copolymers (including, but not limited to styrene-butadiene-styrene (SBS), styrene-isoprene-styrene (SIS), styrene-isoprene/butadiene-styrene (SIBS), styrene-ethylene/butylene-styrene (SEBS), styrene-ethylene/propylene (SEP), and styrene-ethylene/propylene-styrene (SEPS)), co-polyester-based thermoplastic elastomers (TPC), urethane-based thermoplastic elastomers (TPU), or polyamide-based thermoplastic elastomers (TPA), for example. In preferred embodiments, the polymer having a Shore D hardness in the above-identified range is comprised at a content of from 0.5 to 40 wt.-%, further preferably at a content of from 1 to 30 wt.-%, based on the total weight of the adhesive layer.

While not being particularly limited, the thickness of the adhesive layer is preferably in the range of 2 to 30 μm, especially preferably in the range of 2 to 15 μm.

The surface density of the adhesive layer is preferably in the range of from 2 to 50 g/m$^2$, more preferably from 2 to 20 g/m$^2$, especially preferably from 3 to 10 g/m$^2$.

Each of the barrier layer, the intermediate layer and the adhesive layer may independently further include conventional additives known in the art, such as antioxidants, coloring agents, flame retardants, lubricants, stabilizers or anti-blocking agents (e.g. silica-based anti-blocking additives), for example. Such additives are preferably added at a total content of up to 10 wt.-% per total weight of each layer, preferably between 0.1 to 8 wt.-%, to improve the processability, stability or other properties of the layer materials.

It is understood that the multilayer film according to the present invention may include one or more further layers in addition to the barrier layer, the intermediate layer, and the adhesive layer, such as a tie layer or a recycled layer, for example. In addition, each of the three layers may be composed of multiple sub-layers. In some embodiments, however, the multilayer film may consist of single films of above-described barrier layer, intermediate layer and adhesive layer, particularly if low coating thicknesses and low laminate weight is desired.

In general, it is preferred that the total thickness of the multilayer film is in the range of 5 to 80 μm, especially preferably in the range of 10 to 75 μm.

Multilayer Laminate

Figure 1B:
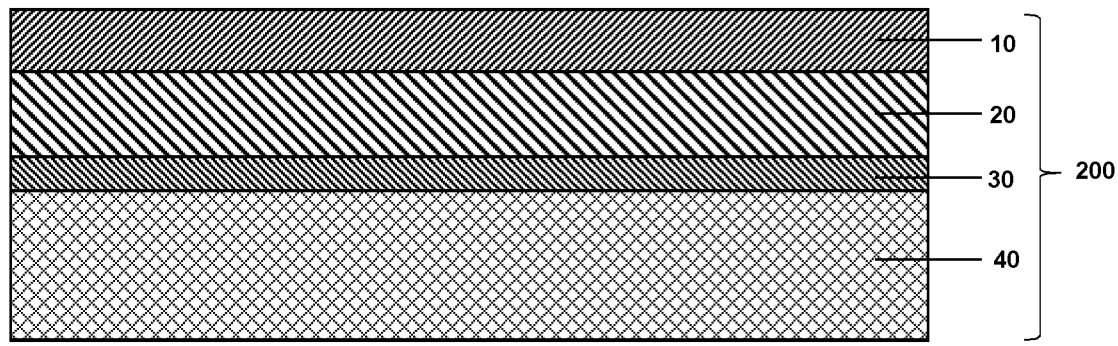
FIG. 1B shows a multilayer laminate according to an embodiment of the present invention.

In a second embodiment, illustrated in FIG. 1B, the present invention relates to a multilayer laminate (200) comprising a fabric layer (40) adhered to a multilayer film according to the above-described first embodiment via the adhesive layer (30). Accordingly, the adhesive layer (30) may be laminated directly to the fabric layer (40) to form the multilayer laminate (200).

Unless defined otherwise, the term "fabric layer", as used herein, denotes a layer of net or fabric made of woven or knitted, synthetic fibers, natural fibers, regenerated fibers, semi-synthetic fibers, inorganic fibers, and combinations thereof (including blended yarns and mixed weaves). Among them, woven fabrics may be preferable when aiming high mechanical strength.

In preferred embodiments, the fabric layer is made of synthetic fibers, of which those comprising (co-)polymers based on polyamide (e.g. nylon, aramide), polyester (e.g. polybutylene terephthalate (PBT), polyethylene terephthalate (PET)), polysulfone, polyether ketone (e.g. PEEK) and/or polyolefin (e.g. polyethylene, polypropylene) are further preferred. Preferred examples thereof include, but are not limited to polyamides, polyesters, rayon, polyether ketones, polysulfones and derivatives thereof. Polyamides and polyesters are especially preferred.

The thickness of the fabric layer is not particularly limited and may be suitably selected by the skilled artisan depending on the use of the resulting multilayer laminate and the selected fabric material. For instance, for airbag applications, typical thicknesses of fabric layers are in the range of between is 0.05 mm to 0.50 mm, such as from 0.1 to 0.40 mm.

Airbag

In a third embodiment, the present invention relates to an inflatable airbag comprising the multilayer laminate according to the second embodiment.

While not being limited thereto, the airbag may be a frontal airbag, side airbag, knee airbag, curtain airbag, seat cushion airbag, center airbag, external airbag, seat belt airbag, pedestrian airbag, motorcycle airbag (which may be integrated into a vests or into the motorcycle), bicycle airbag (e.g. collar-type airbag), avalanche airbag (e.g. backpack-integrated) and the like. Despite of the light weight and thinness of the multilayer film used in the multilayer laminate, the resulting airbags are resistant to delamination and disintegration and exhibit sufficient strength and gas impermeability to be effectively used either as conventional vehicle airbags to reduce weight and volume in the deflated state, or as airbags which necessitate full deployment for prolonged periods of time (e.g. curtain airbags, avalanche airbags, motorcycle or bicycle airbags).

Accordingly, the geometry of the airbags, the type of seams and the sealing process is not limited and may be appropriately selected from those known in the art. For instance, the inflatable airbag may be produced as a one-piece woven airbag (OPW) without seams (according to DE 102 24 771 A1, for example) or by joining multiple cut-to-size pieces of multilayer laminates, which may be optionally suitably folded before joining (according to US 2010/0320736 A1 or US 2014/0014253 A1, for example). Typically, OPWs used for curtain airbags exhibit a complex curved surface in which a plurality of rooms are formed, and may have an uneven structure in the inflated state, which is particularly prone to peeling between the fabric layer and the multilayer film. However, by using the multilayer film according to the first embodiment, the multilayer film can be firmly adhered even to such irregular surfaces and delamination can be effectively prevented.

The airbag may be incorporated into passive restraint systems and airbag assemblies known in the art, which typically comprise an airbag control unit (ACU) that monitors one or more related sensor(s) (including accelerometers, impact sensors, side (door) pressure sensors, wheel speed sensors, gyroscopes, brake pressure sensors, and seat occupancy sensors, for example) and triggers a gas generator unit when the sensor(s) measure a value reaching or exceeding a predetermined threshold.

Methods of Fabrication and Uses

In a fourth embodiment, the present invention relates to a method of manufacturing a multilayer laminate for an airbag, comprising the steps of: providing a multilayer film according to the first embodiment, and bonding the multilayer film to a fabric layer.

Multilayer films according to the first embodiment can be formed using techniques known to those of skill in the art. For instance, for those layers that can be coextruded, such layers can be coextruded as blown films or cast films using techniques known to those of skill in the art in a single extrusion step. Alternatively, the multilayer films can be produced by forming the adhesive layer, the intermediate layer and the barrier layer in advance as separate sheets or films by extrusion, for example, followed by bonding and integrating the sheets or films with each other. For example, the respective sheets or films may be superposed and melt-pressed by a heat press or a heat roll.

The thus produced multilayer film is then bonded to a fabric layer, such as a fabric layer described above in the context of the second embodiment. Bonding may be achieved by a lamination step, wherein the multilayer film is provided on the fabric layer and heated to a temperature below the melting point of the barrier layer (e.g. during or after being provided on the fabric layer).

The resulting multilayer laminate obtained by laminating the multilayer film and the fabric layer exhibits a sheet-like structure, which may include, in addition to a planar shape, a cylindrical, bag-like, and balloon-like shape.

Figure 1C:
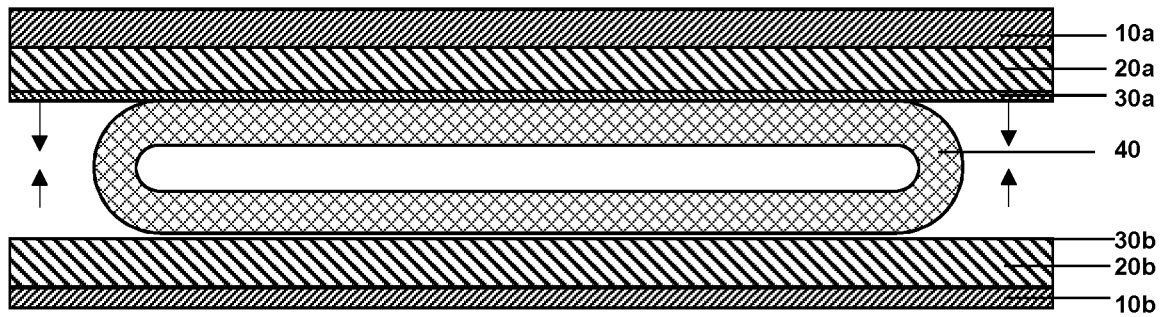
FIG. 1C illustrates an exemplary process of coating a one-piece fabric on both sides with a multilayer film according to the present invention.

In an exemplary embodiment illustrated in FIG. 1C, two identical or different multilayer films according to the first embodiment of the present invention may be simultaneously bonded to opposed surfaces of a cylindrical, bag-like or balloon-like shaped fabric layer (40), so that the adhesive layers (30a) and (30b) contact and adhere to each other at the seams (as indicated by the arrows in FIG. 1C).

While not being limited thereto, suitable techniques and apparatuses for bonding the multilayer film to the fabric layer are disclosed in WO 2018/230721 A1, US 2007/0065614 A1, and EP 1967 422 A1, for example.

In a fifth embodiment, the present invention relates to the use of the multilayer film according to the first embodiment for the gas-tight coating of a woven or knitted fabric or net. In this respect, the multilayer film is thin, light-weight, and substantially impermeable to gas and can therefore preferably be used as a coating of a wide range of textiles, for the production of airbags, sails, and garments.

It will be understood that the preferred features of the first embodiment to fifth embodiments may be freely combined with each other in any combination, except for combinations where at least some of the features are mutually exclusive.

EXAMPLES

A blown film-coextrusion method was used to produce multilayer films in a single step. The multilayer films were produced by a Dr. Collin's blown coextrusion line having 3 layers. The raw materials for barrier layer formulation, intermediate layer formulation, and adhesive layer formulation were put into the corresponding extruder, respectively, whereupon the materials were molten at a temperature exceeding their melting point. The molten resins simultaneously exited the die head, and fused multilayer films were obtained.

The reagents used and their abbreviations in Table 1 are explained in the following:

TPEE 1: Amitel®-TPC (thermoplastic copolyester elastomer with a melting temperature of ≥180° C. (ISO 11357-3), commercially available from DSM Engineering Plastics)

TPEE 2: Hytrel® Series thermoplastic polyester elastomer with a melt temperature of 210° C. and a glass transition temperature of 0° C., commercially available from DuPont.

TPEE 3: Hytrel® Series thermoplastic polyester elastomer having a Shore D hardness of 37, with a melt temperature of 152° C. and a glass transition temperature of −50° C., commercially available from DuPont.

PA: UBE Nylon (nylon 6, 6, 12 with a melting temperature of 188° C., commercially available from Ube Industries, Ltd.)

PA-CP: Pebax® (polyether block amide with a melting temperature of ~158° C., commerically available from Arkema S.A.)

PO: ExxonMobil™ LDPE (low-density polyethylene, commercially available from ExxonMobil Chemical)

MAH-polyolefin1: Plexar™ Tie layer resin (maleic anhydride-modified linear low density polyethylene plastomer with a melting temperature of 124° C., commercially available from LyondellBasell). MAH-polyolefin 2: Admer™ Adhesion resin (maleic anhydride grafted co-polypropylene with a melting temperature of 147° C., commercially available from Mitsui Chemicals, Inc.)

α-olefin copolymer: Queo™ Plastomer (ethylene based octene-1 plastomer with a melting temperature of 73° C., commercially available from Borealis)

α-olefin copolymer 2: Tafmer™ PN elastomer (propylene-based α-olefin copolymer with a melting point of 160° C., commercially available from Mitsui Chemicals, Inc.)

The resultant triple layer films were laminated to a polyethylene terephthalate (PET) fabric (Examples 1-5 and 8 and Comparative Examples 1-3) or polyamide (PA) fabric (Examples 6 and 7) composed of high-strength yarn on a Meyer twin-belt lamination system.

The process conditions for lamination of the multilayer film to the fabric involved a laminating temperature of 170° C., a layer thickness set to 0 mm, a level (height adjustment of upper pressure roll) of 0 mm, an exerted pressure of 18 N/cm$^2$, and a lamination speed 1.6 m/min.

After production, the samples were subjected to peel strength measurements. For this purpose, a backing layer was provided on the multilayer film so as to prevent film elongation during peeling, and each pair of laminates was clamped into a tensile testing machine, and the peel strength of the bond between the intermediate layer and adhesive layer was measured for each of the examples at room temperature and at 100 mm/min. The results of these measurements are shown in Table 1.

The comparison between Examples 1 to 8 and Comparative Examples 1 to 3 shows that multilayer laminates according to the present invention comprising MAH-grafted polyolefins in combination with α-olefin copolymers in the intermediate layer exhibit superior peel strength. In addition, no pinholes have been observed on the barrier layer surfaces of Examples 1 to 8, which indicates that the gas barrier properties are effectively maintained upon lamination even at low coating surface densities.

TABLE 1

| No. | Barrier Layer Formulation [wt.-%] TPEE 1 | TPEE 2 | PA | Anti-blocking agent | Surface Density [g/m²] | Lamination Layer / Intermediate Layer Formulation [wt.-%] MAH-PO 1 | MAH-PO 2 | α-olefin copolymer 1 | α-olefin copolymer 2 | TPEE 3 |
|---|---|---|---|---|---|---|---|---|---|---|
| Example 1 | 97 | — | — | 3 | 10 | 70 | — | 30 | — | — |
| Example 2 | 97 | — | — | 3 | 10 | 50 | — | 50 | — | — |
| Example 3 | — | 97 | — | 3 | 10 | 50 | — | 50 | — | — |
| Example 4 | 97 | — | — | 3 | 10 | 30 | — | 70 | — | — |
| Example 5 | — | — | 97 | 3 | 10 | 50 | — | 50 | — | — |
| Example 6 | — | — | 97 | 3 | 10 | 50 | — | 50 | — | — |
| Example 7 | 97 | — | — | 3 | 10 | — | 50 | — | 50 | — |
| Example 8 | 97 | — | — | 3 | 10 | 30 | — | 10 | — | 60 |
| Comparative Example 1 | 97 | — | — | 3 | 10 | 100 | — | — | — | — |
| Comparative Example 2 | 97 | — | — | 3 | 10 | — | — | 100 | — | — |
| Comparative Example 3 | 97 | — | — | 3 | 10 | 50 | — | — | — | — |

| No. | Lamination Layer / Intermediate Layer Formulation [wt.-%] PO | Surface Density [g/m²] | Adhesive Layer Formulation [wt.-%] TPEE 3 | PO | PA-CP | Additives* | Surface Density [g/m²] | Substrate | Peel force [N/mm] |
|---|---|---|---|---|---|---|---|---|---|
| Example 1 | — | 25 | 85 | 10 | — | 5 | 5 | PET | 1.1 |
| Example 2 | — | 25 | 85 | 10 | — | 5 | 5 | PET | 1.3 |
| Example 3 | — | 25 | 85 | 10 | — | 5 | 5 | PET | 1.3 |
| Example 4 | — | 25 | 85 | 10 | — | 5 | 5 | PET | 0.6 |
| Example 5 | — | 25 | 85 | 10 | — | 5 | 5 | PET | 1.3 |
| Example 6 | — | 25 | — | — | 100 | — | 5 | PA | 0.6 |
| Example 7 | — | 25 | — | — | 100 | — | 5 | PA | 0.6 |
| Example 8 | — | 25 | 85 | 10 | — | 5 | 5 | PET | 1.3 |
| Comparative Example 1 | — | 25 | 85 | 10 | — | 5 | 5 | PET | 0.3 |
| Comparative Example 2 | — | 25 | 85 | 10 | — | 5 | 5 | PET | 0.5 |
| Comparative Example 3 | 50 | 25 | 85 | 10 | — | 5 | 5 | PET | 0.1 |

*mixture of commercially available antioxidants, anti-blocking agents and colorants Accordingly, it has been shown that the present invention can provide multilayer laminates which ensure both a high gas tightness of the multilayer structure and excellent peel strength, and are thus resistant to delamination, disintegration and the formation of pinholes and even when using small coating weight and/or extremely thin coating films.

Once given the above disclosure, many other features, modifications, and improvements will become apparent to the skilled artisan.

REFERENCE NUMERALS

10, 10a: barrier layer
20, 20a: intermediate layer
30, 30a: adhesive layer
40: fabric layer
100: multilayer film
200: multilayer laminate

The invention claimed is:

1. A multilayer film comprising:
   a) a barrier layer comprising a thermoplastic polyester elastomer or a polyamide copolymer;
   b) an intermediate layer provided on the barrier layer and comprising both a maleic anhydride (MAH)-grafted polyolefin and an α-olefin copolymer; and
   c) an adhesive layer provided on the intermediate layer and comprising a thermoplastic polyester elastomer or a polyamide copolymer; and
   wherein in the intermediate layer, the content of maleic anhydride (MAH)-grafted polyolefin is between 10 to 95 wt.-%, and the content of α-olefin copolymer is between 5 to 90 wt.-%, based on the total weight of the intermediate layer; and
   wherein a content of the MAH-grafted polyolefin is capable of exceeding the content of the α-olefin copolymer in the intermediate layer.

2. The multilayer film according to claim 1, wherein the maleic anhydride (MAH)-grafted polyolefin is selected from MAH-grafted polyethylene, MAH-grafted polypropylene, or copolymers thereof.

3. The multilayer film according to claim 1, wherein the maleic anhydride (MAH)-grafted polyolefin comprises 0.1 to 2.0 wt.-% MAH, based on the total weight of the maleic anhydride (MAH)-grafted polyolefin.

4. The multilayer film according to claim 1, wherein the adhesive layer further comprises a polyolefin.

5. The multilayer film according to claim 1, wherein in the intermediate layer, the content of α-olefin copolymer is between 10 to 65 wt.-% based on the total weight of the intermediate layer.

6. The multilayer film according to claim 1, wherein the thickness of the barrier layer is in the range of 2 to 30 μm, the thickness of the intermediate layer is in the range of 2 to 45 μm, and the thickness of the adhesive layer is in the range of 2 to 30 μm; and/or wherein the total thickness of the multilayer film is in the range of 10 to 75 μm.

7. The multilayer film according to claim 1, wherein the surface density of the barrier layer is in the range of from 5 to 30 $g/m^2$; the surface density of the intermediate layer is in the range of from 5 to 50 $g/m^2$; and the surface density of the adhesive layer is in the range of from 2 to 20 $g/m^2$.

8. The multilayer film according to claim 1, wherein the adhesive layer further comprises a polyethylene.

9. The multilayer film according to claim 1, wherein in the intermediate layer, the content of maleic anhydride (MAH)-grafted polyolefin is between 35 to 90 wt.-%, and the content of α-olefin copolymer is between 10 to 65 wt.-%, based on the total weight of the intermediate layer.

10. The multilayer film according to claim 1, wherein the surface density of the barrier layer is in the range of from 7 to 20 $g/m^2$; the surface density of the intermediate layer is in the range of from 10 to 40 $g/m^2$; and the surface density of the adhesive layer is in the range of from 3 to 10 $g/m^2$.

11. The multilayer film according to claim 1, wherein the MAH-grafted polyolefin in the intermediate layer includes a blend of MAH-grafted polyolefin and non-MAH grafted polyolefin.

12. The multilayer film according to claim 1, wherein the α-olefin copolymer is non-MAH-grafted.

13. The multilayer film according to claim 1, wherein the intermediate layer further comprises a polymer having a Shore D hardness according to ISO 868 of less than 80.

14. The multilayer film according to claim 13, wherein the polymer is selected from polyolefins or thermoplastic elastomers.

15. The multilayer film according to claim 13, wherein the polymer is selected from any of polyethylene, polypropylene, or styrene block copolymers.

16. A multilayer laminate comprising a fabric layer adhered to a multilayer film according to claim 1 via the adhesive layer.

17. The multilayer laminate according to claim 16, wherein the fabric layer comprises a polyamide and/or a polyester.

18. An inflatable airbag comprising the multilayer laminate according to claim 16.

19. A method of manufacturing a multilayer laminate for an airbag, comprising the steps of:
providing a multilayer film according to claim 1, and
bonding the multilayer film to a fabric layer.

20. A method of using the multilayer film according to claim 1 for the gas-tight coating of a woven or knitted fabric.

* * * * *